No. 892,471. PATENTED JULY 7, 1908.
H. A. VOELKNER.
BOX FASTENER.
APPLICATION FILED JULY 8, 1907.

Witnesses
H. H. Yarrington.
Georgiana Chace

Inventor
Henry A. Voelkner
By Luther V. Moulton
Attorney

UNITED STATES PATENT OFFICE.

HENRY A. VOELKNER, OF DETROIT, MICHIGAN.

BOX-FASTENER.

No. 892,471.     Specification of Letters Patent.     Patented July 7, 1908.

Application filed July 8, 1907. Serial No. 382,640.

*To all whom it may concern:*

Be it known that I, HENRY A. VOELKNER, a citizen of the United States of America, residing at Detroit, in the county of Wayne and State of Michigan, have invented certain new and useful Improvements in Box-Fasteners; and I do hereby declare the following to be a full, clear, and exact description of the invention, such as will enable others skilled in the art to which it appertains to make and use the same.

Figure 1:
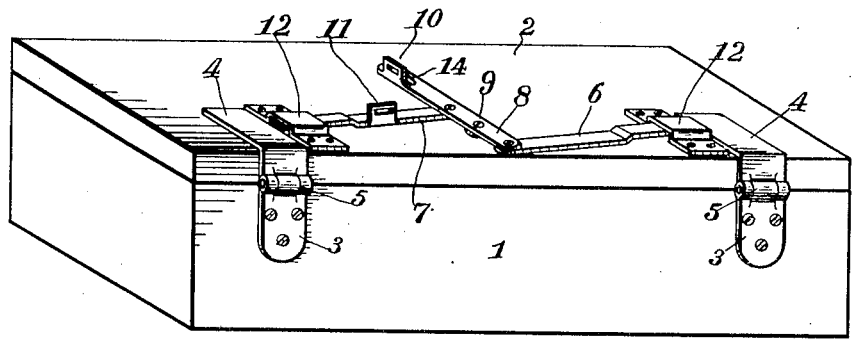
Figure 2:
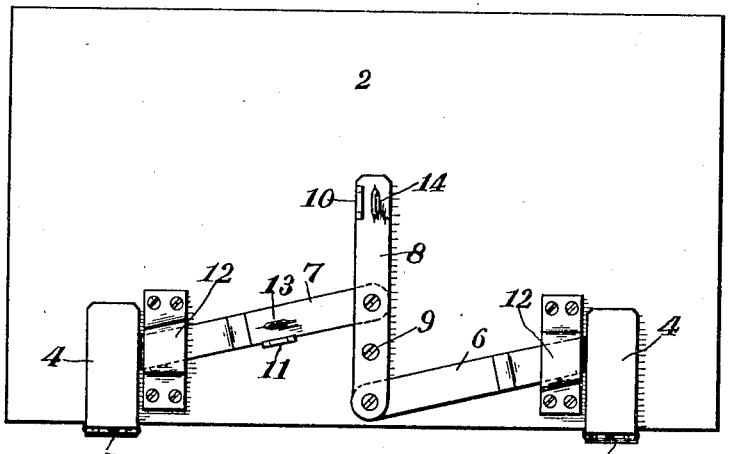

My invention relates to improvements in box fasteners; and its object is to provide the same with various new and useful features hereinafter more fully described and particularly pointed out in the claims, reference being had to the accompanying drawings, in which:

Figure 1. is a perspective view of a box with my invention applied thereto; Fig. 2. a plan view of the same with the fastening released; and Fig. 3. the same with the fastening secured.

Like numbers refer to like parts in all of the figures.

Figure 3:
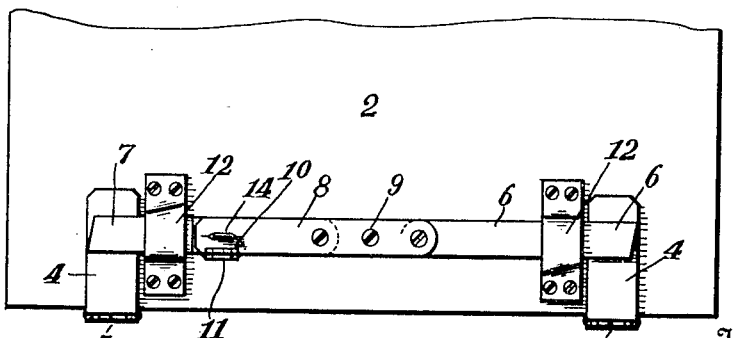

1 represents any convenient box or receptacle; 2 a hinged cover for the same. To the front of the box and near each end of the same is attached the fixed member 3 of an angular hinged hasp or holder for securing the cover. The other member 4 of this hasp is hinged to this fixed member as at 5 preferably opposite the seam between the cover and the box, and this hinged member 4 is bent at right angles and extends rearwardly on top of the cover and holds the same closed. These hasp members 4 are securely held down upon the top of the cover by means of longitudinally movable bolts 6 and 7 having their outer ends adapted to slide over and engage the hasp members 4. These bolts are slidable within clips 12 attached to the cover. The adjacent ends of these bolts are spaced apart and pivoted to a lever 8, this lever being pivoted to the cover midway between the pivots of the bolts as at 9. This lever serves to longitudinally adjust the bolts and secure the same. For the purpose of securing the lever to hold the bolts in locked position, the lever is provided near one end with an upturned flange 10 having an opening therethrough and the bolt 12 is provided with a corresponding and opposing flange 11 having a similar opening therethrough, through which openings may be inserted a seal or lock to secure the lever and bolts in locked position. To also detachably hold the lever in this position, a projection 13 is struck up on the bolt 7; which projection engages a corresponding depression 14 struck up in the under side of the lever 8, whereby the lever will spring upward and pass over the projection 13 and engage the same with the depression 14, and thus hold the lever superposed above the bolt 7, as shown in Fig. 3.

What I claim is:

1. A box fastening, comprising two hinged angular hasps, bolts each having one end slidably engaging a hasp, a lever to which the other ends of the bolts are pivoted, a pivot for the lever located intermediate the ends of the bolts, clips in which the bolts are slidable, and opposing upturned flanges on the lever and on one of the bolts respectively, said flanges having openings to receive a lock or seal.

2. A box fastener, comprising two hinged angular hasps, bolts each having one end slidably engaging a hasp, a lever to which the other ends of the bolts are pivoted, a pivot for the lever located between the ends of the bolts, clips in which the bolts are slidable, a projection on one bolt and a recess in the lever to receive the said projection.

3. A box fastener, consisting of two hinged angular hasps, two bolts adapted to slidably engage the hasps, two clips in which the bolts are slidable, a lever to which the other ends of the bolts are pivoted, and a pivot for the lever and intermediate the ends of the bolts, one bolt having a projection and an upturned perforated flange, and the lever having a recess to receive the projection and an upturned perforated flange opposite the flange on the bolt.

4. The combination of a box having a hinged cover, a hinged angular hasp near each end of the box, each hasp having one member secured to the box and the other member detachably engaging the top of the cover, bolts each having one end slidably engaging the respective hasp to secure the same, a lever to which the bolts are pivoted and spaced apart at their ends, a pivot located intermediate the ends of the bolts and securing the lever to the cover, clips secured to the cover, in which clips the bolts are slidable, and opposing members respectively on the lever and one of the bolts and adapted to receive a seal or lock.

In testimony whereof I affix my signature in presence of two witnesses.

HENRY A. VOELKNER.

Witnesses:
SAMUEL E. THOMAS,
GRACE E. WYNKOOP.